(12) United States Patent
Spray et al.

(10) Patent No.: US 6,298,914 B1
(45) Date of Patent: *Oct. 9, 2001

(54) WIRE-WRAPPED WELL SCREEN

(75) Inventors: Jeffery A. Spray, 51 Coffeen Ave., Suite 101, PMP 270, Sheridan, WY (US) 82801; Donald D. Schwimmer, Idaho Falls, ID (US)

(73) Assignee: Jeffery A. Spray, Dana Point, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/448,572

(22) Filed: Nov. 23, 1999

Related U.S. Application Data

(63) Continuation-in-part of application No. 09/123,197, filed on Jul. 27, 1998, now Pat. No. 6,089,316, which is a continuation-in-part of application No. 08/904,883, filed on Aug. 1, 1997, now Pat. No. 5,785,122.

(51) Int. Cl.$^7$ ..................................................... E21B 43/08
(52) U.S. Cl. ........................................... 166/227; 166/232
(58) Field of Search ................................... 166/227, 228, 166/231, 232

(56) References Cited

U.S. PATENT DOCUMENTS

| | | |
|---|---|---|
| 880,635 | 3/1908 | Decker .................................. 166/232 |
| 1,273,236 | 7/1918 | Layne ................................... 166/232 |
| 1,367,406 | 2/1921 | Mc Clean . |
| 1,715,856 | 6/1929 | Mc Evoy, Jr. . |
| 2,155,744 | 4/1939 | Van Westrum . |
| 2,346,647 | 4/1944 | Bennison . |
| 3,584,685 | 6/1971 | Boyd . |
| 3,712,373 | 1/1973 | Bearden et al. . |
| 3,789,924 | 2/1974 | Aaltonen et al. . |
| 4,167,972 | 9/1979 | Sears . |
| 4,299,283 | 11/1981 | Gryskiewicz . |
| 4,381,820 | 5/1983 | Wagner . |
| 5,095,990 | 3/1992 | Best et al. ............................. 166/227 |
| 5,115,864 | 5/1992 | Gaidry et al. . |
| 5,307,984 | 5/1994 | Nagaoka et al. . |
| 5,355,948 | 10/1994 | Sparlin et al. . |
| 5,355,949 | 10/1994 | Sparlin et al. . |
| 5,504,987 | 4/1996 | Bergkvist et al. . |
| 5,785,122 | * 7/1998 | Spray ................................... 166/227 |
| 6,089,316 | * 7/2000 | Spray ................................... 166/227 |

FOREIGN PATENT DOCUMENTS

| | | |
|---|---|---|
| 496877 | 9/1970 | (CH) . |
| 3913986 | 3/1989 | (DE) . |
| 0 617 195 | 9/1994 | (EP) . |
| 1 400 673 | 7/1975 | (GB) . |

OTHER PUBLICATIONS

Driscoll, F. G., et al. "Continuous Slot Screen", Groundwater and Wells, Second Edition, 1986, Johnson Filtration Systems, Inc., St. Paul, MN, pp. 396–400.

"Wall Thickness", A Guide to Water Well Casing and Screen Selection, Roscoe Moss Company, Los Angeles, CA, 1982, p. 27.

"Stainless Steel Vee–Wire Pipe Size Screens", Johnson Screen General Brochure–ENV–5101, Johnson Filtration, Inc., St. Paul, MN, 1993, p. 5.

(List continued on next page.)

*Primary Examiner*—William Neuder
(74) *Attorney, Agent, or Firm*—John P. O'Banion

(57) ABSTRACT

A well screen for placement within wells used to filter out impurities from the fluid entering the well. In the preferred embodiment, the well screen comprises a spirally-wound wire forming a cylinder with gaps between the layers of wire. The layers of wire are attached by spacers placed within the gaps. In an alternative embodiment, the well screen is formed from concentric rings, and in a third embodiment the well screen is formed from a cylindrical tubes that are machined to remove material to form horizontal gaps. In the first two embodiments, at least one spacer is integrally formed to the wire or a ring to minimize the amount of welding required to secure the spacers to adjacent rings or windings.

27 Claims, 11 Drawing Sheets

OTHER PUBLICATIONS

"Roscoe Moss Continuous Slot Screens", Roscoe Moss Company General Catalog, Roscoe Moss Company, Los Angeles, CA, 1985.

Ellis, R. C. et al., "San Control Handbook", Second Edition, 1983, Gulf Publishing Co., Houston, TX, pp. 1–6, pp. 33–41, pp. 42–50, pp. 51–59, pp. 60, Table 12.1.

"The Concept of Sand Control . . . ", Guide to Well Screen Technology, Houston Well Screen Company, Houston, TX, 1988, pp. 3–15.

"Nagaoka Ring Base Screen", Nagaoka Company General Brochure, 1988, pp. 29–44.

"5 Reasons to Specify Johnson Screens On Your Next Job", Johnson Screen General Brochure, Johnson Filtration, Inc., St. Paul, MN, Jun. 1993.

"Continuous Slot Screens", Ground Water Age, Johnson Filtration, Inc., St. Paul, MN, Jun. 1991, p. ER–1.

* cited by examiner

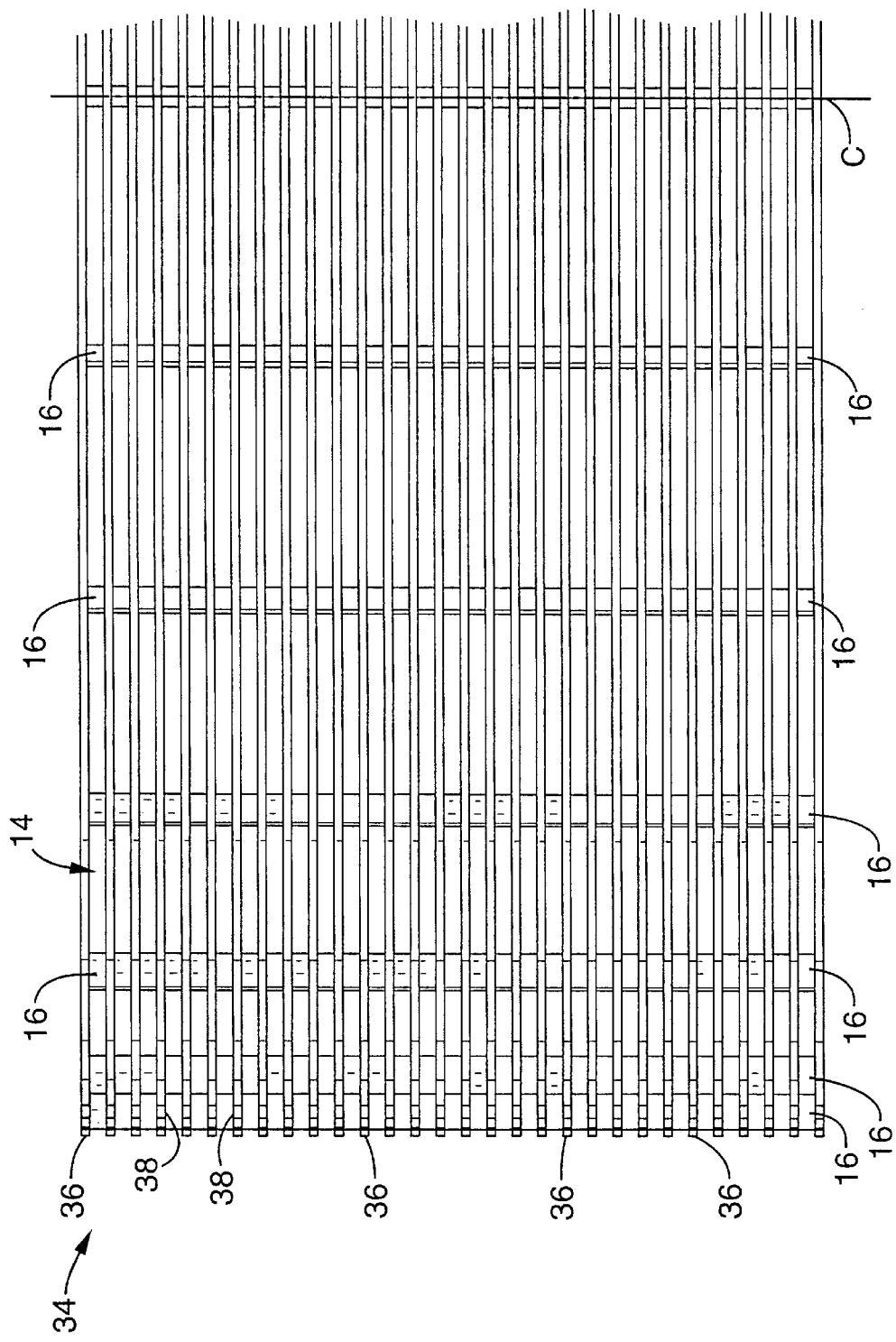
FIG. — 12

WIRE-WRAPPED WELL SCREEN

CROSS-REFERENCE TO RELATED APPLICATIONS

This application is a continuation-in-part of application Ser. No. 09/123,197 filed on Jul. 27, 1998, now U.S. Pat. No. 6,089,316, which is a continuation-in-part of application Ser. No. 08/904,883 filed on Aug. 1, 1997, now U.S. Pat. No. 5,785,122.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to well screens for oil, gas, mineral, and groundwater production, and groundwater monitoring, and more particularly to an improved one piece wire-wrapped well screen.

2. Description of the Background Art

When water, oil and gas producing wells are drilled through unconsolidated formations, the produced fluids generally contain particulate matter, usually sand. The production of sand, along with the fluids, is an undesired consequence because the sand causes extra wear and abrasion of production tubing, valves, pumps, and other equipment used to produce and remove fluids from the wells. It is therefore beneficial to avoid or minimize the production of sand or other particulate matter during the production of fluids from wells.

One method of accomplishing the reduction of sand or particulate production is by "gravel packing" the well during completion operations. Such gravel packing includes providing on the production conduit or tubular work string a slotted or ported cylindrically shaped member, generally known as well screens, which restricts the passage of particles into the interior of the conduit. For many years, well screens have been used in wells to permit fluid to flow through the screen and into the well while retaining sand and other particulate matter outside the well screen.

A common well screen design uses longitudinal supports tangentially welded to a helical band to produce a frame upon which strainer elements or inserts are attached. The strainer elements or inserts fill the gaps between the longitudinal and helical bars and serve to retain sand and other particulate matter. In such designs, the filtration screen is not self-supporting and is dependent on the frame for rigidity.

Other designs of well screens incorporate "projections" that are formed in a stack of rings and which protrude parallel to the longitudinal axis of the structure and perpendicular to the rings. This enables installers to adjust the gap between the rings during installation of the well screen. However, the projections do not provide structural rigidity to the screen and merely rest on the inner surface of the rings, thereby resulting in an undulated inner well screen surface.

Current screen design practice assumes a 1% ellipticity, which significantly reduces collapse strength and requires use of excess materials in order to achieve the desired resistance. The general tensile calculation for conventional wire wrap screens includes an approximate 30% welding de-rating effect due to welding of the wire or ring apex to the rod tangent, which is also a corrosion enhancer. Wire/rod screens have no torsional qualities. Corrosion, well construction defects, or manufacturing errors occasionally lead to holes or cracks in well casings or screens. One approach toward repair is to spot a serrated piece of slightly undersized casing and hydraulically pressing this piece over the problem area, essentially forming a patch. This is impractical due to the presence of vertical rod protrusions in conventional wire wrap screens.

Conventional wire wrap screens normally show mostly steel, not open area available for fluid to flow through. The usual range of open area percentage exposed to abutting geological formations is 20%–50% with a fluid entrance efficiency of approximately 90% at best.

BRIEF SUMMARY OF THE INVENTION

By way of example and not of limitation, the present invention is a well screen which generally comprises a wire which is spirally wound to form a cylinder with spaces between each layer of wire. Spacers between the wire at intervals around the circumference of the well screen serve to attach the layers of wire together. The spacers do not extend radially beyond the inner or outer edge of the wire. The spacers can be flush with either the inner and/or outer edge of the wire or recessed from either the inner and/or outer edge of the wire. The spacers are permanently and securely attached to the wire by means such as welding, resulting in a single unitized well screen that is also very structurally rigid.

In an alternate embodiment of the invention, the well screen comprises a plurality of rings stacked atop one another and connected together by spacers located at intervals around the circumference of the rings, generally forming a cylinder. The spacers do not extend radially beyond either the inner or outer edge of the rings. The spacers can be flush with either the inner and/or outer edge of the ring or recessed from either the inner and/or outer edge of the ring. The spacers are attached to the rings in the same manner as with the spiral wire well screen design.

The rings or wire may also have the spacers integrated into the top, bottom or top and bottom surfaces in alternative embodiments. This integrated spacer embodiment allows the wire or steel rings to be joined by fillet welds on a single surface thereby reducing the total number of welds required to manufacture the screens. It should also be understood that the rings can be manufactured from a variety of materials by a variety of processes such as forging, stamping, extruding, molding and casting.

This spacer/wire and spacer/ring design allows for fabrication and use of any thickness or width of wire or ring. By increasing wire or ring thickness and essentially melting the vertically oriented rod components of wire wrap screen into the thickness of the rings, and then welding these in place, superior strength is created even with less width profile. Since it is advantageous to provide more open area through which the fluid can enter the screen, aperture dimensions can be varied by adjusting ring thickness, width, spacer dimensions, spacer shapes, placement and orientation, in order to improve fluid flow therethrough, while simultaneously increasing strength and rigidity and reducing material requirements.

The spacer shape is variable, which allows the manipulation of fluid dynamics. Improved fluid flow characteristics can be achieved, thus increasing flow efficiency while reducing corrosion and plugging tendencies of conventional well screen designs.

Since the spacers do not extend beyond the inner surface of the well screen, the flush inner surface of the well screen also allows ready installation of "swaged" patches for damage repair and eases repair when fissures develop during use. The flush inner surface allows the use of zone isolation devices with greater effectiveness. The flush inner surface also allows rotation activities within the screen without interference or catching of rods on the rotating device which would otherwise damage or destroy the screen.

This design eliminates or minimizes problems associated with tangential welding and normal stress points as such welds are more robust and less susceptible to corrosion. In addition, any length of well screen can be easily manufactured because no rods are used.

In another embodiment, the outside diameter of the wire or rings forming the exterior surface of the screen, is formed into a distinct shape, such as a generally square shaped edge. It should be understood to one skilled in the art that any number of shapes could be utilized.

In yet another embodiment of the invention, the screen is formed by the machining of processed tubes to include all of the spacing, angles and other design features disclosed herein. Such machining may include precision milling, Electrical Discharge Machining (EDM), Electron Beaming (EB), Plasma cutting, laser cutting and the like.

An object of the invention is to provide a one-piece rigid well screen which is self-supporting, has increased structural strength and which can be manufactured efficiently and reliably.

Another object of this invention is to provide a greater area through which fluid can flow, thus enhancing the fluid entrance capability and efficiency.

Yet another object of the invention is to provide for a flush inner and outer surface. The flush inner surface allows the well screen to be cleaned using techniques such as vertical wire brushing and rotary scratching.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 12 is a side elevation view of a multiple ring well screen configuration in accordance with the present invention.

DETAILED DESCRIPTION OF THE INVENTION

Referring more specifically to the drawings, for illustrative purposes the present invention is embodied in the apparatus generally shown in FIG. 1 through FIG. 17. It will be appreciated that the apparatus may vary as to configuration and as to details of the parts without departing from the basic concepts as disclosed herein.

Figure 1:
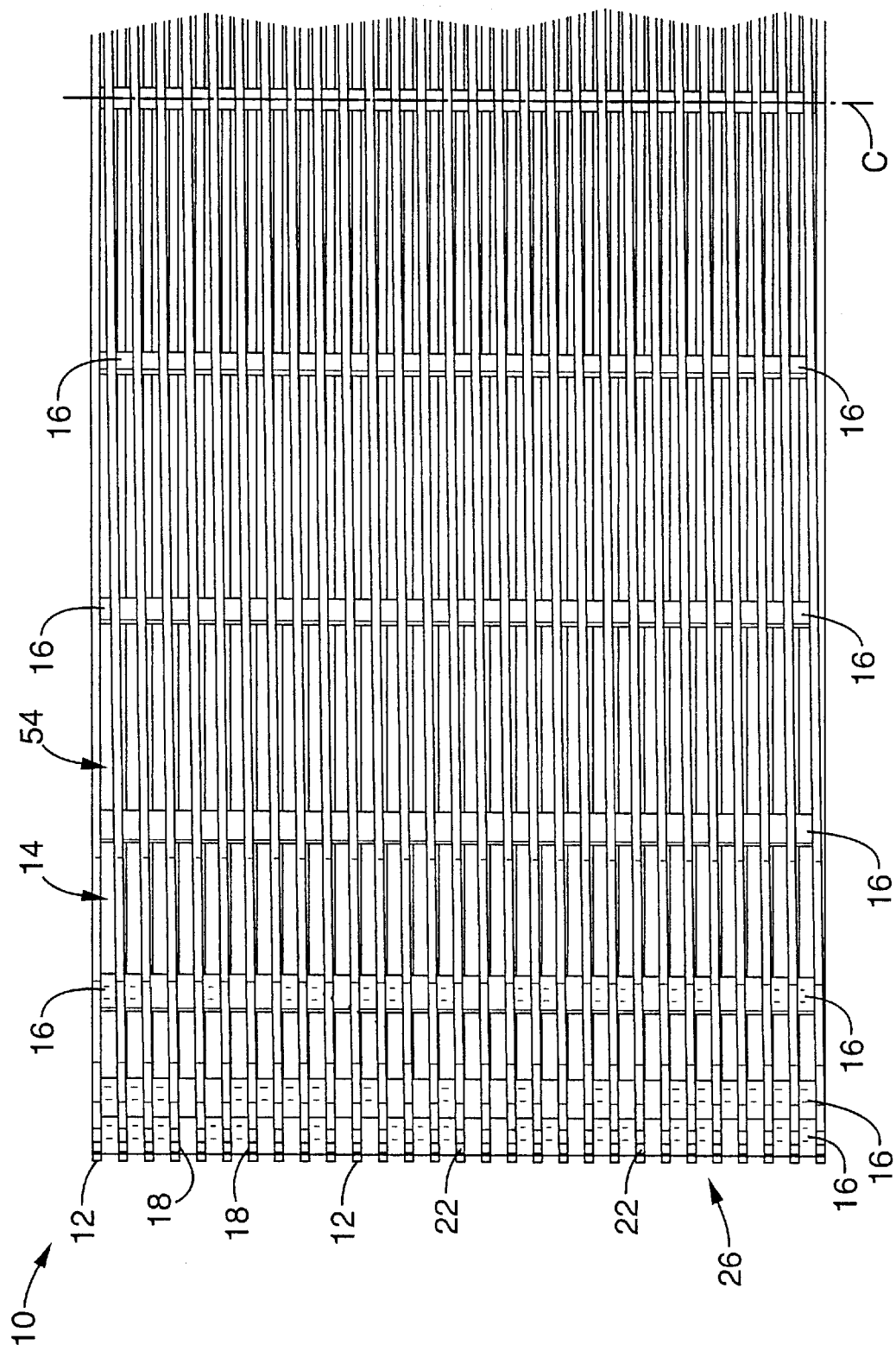
FIG. 1 is a fragmentary side elevation view of a spiral wire well screen in accordance with the present invention.
Figure 2:
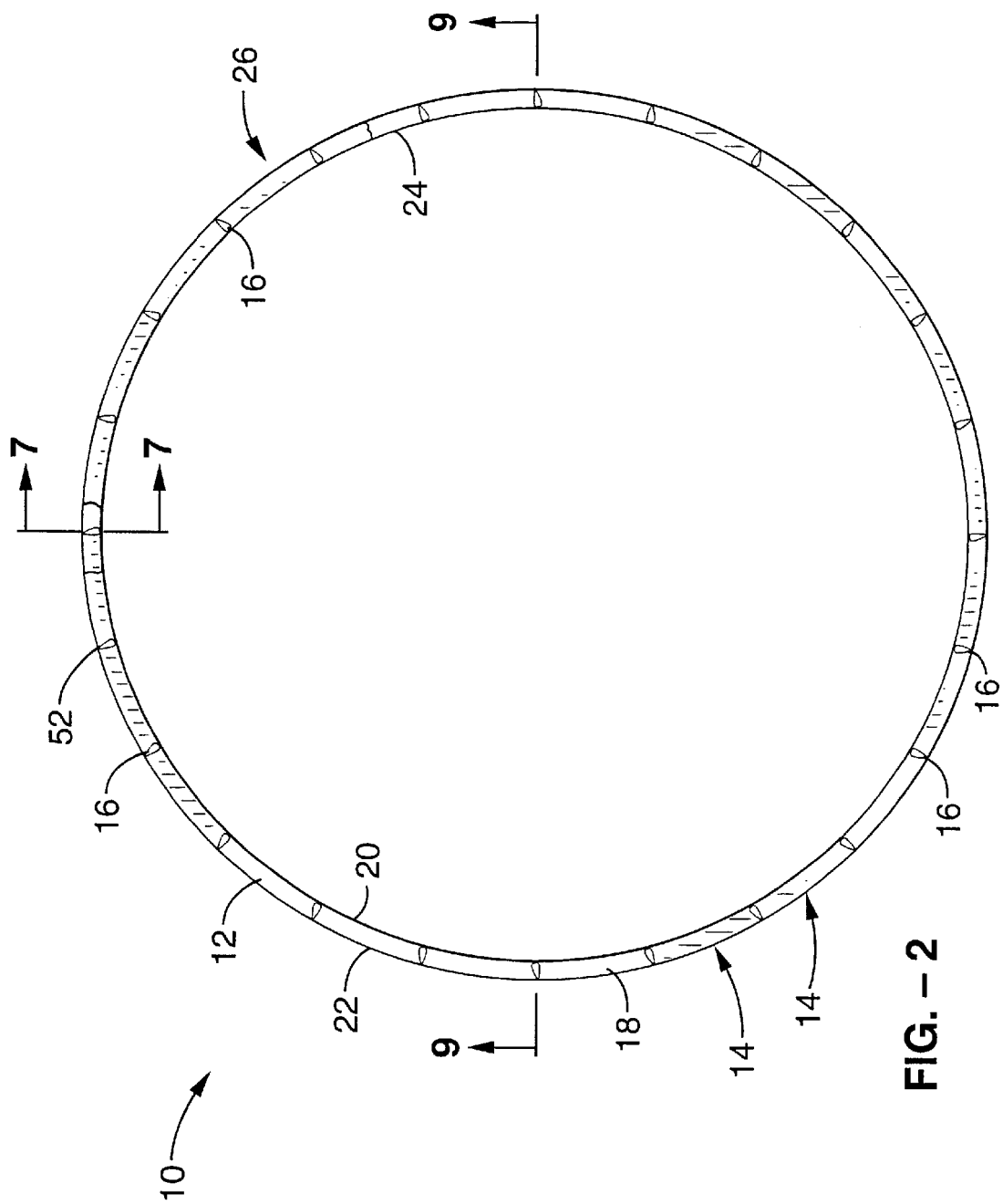
FIG. 2 is a top view of the well screen showing the spacers angled.

Referring first to FIG. 1 and FIG. 2, it will be seen that a well screen 10 in accordance with the present invention generally comprises a wire 12 spirally wound to form a porous cylinder. Wire 12 is wound with evenly spaced gaps 14 between the surfaces 18 of wire 12, with surfaces 18 of wire 12 attached by spacers 16 between the surfaces 18. Spacers 16 are positioned at intervals around the circumference of well screen 10 and do not extend radially from the inner edge 20 or the outer edge 22 of wire 12. An inner surface 24 and an outer surface 26 of well screen 10 is thereby formed. The "C" in FIG. 1 represents the central axis of well screen 10.

Referring also to FIG. 3 through FIG. 7, spacers 16 are designed to minimize disruption of fluid flow along the horizontal axis by using a streamlined or elliptical design 50. The acute 52 or sharper end of spacer 16 is oriented towards outer edge 22 of wire 12, thus minimizing the surface area which restricts fluid flow at or near the entry point. As spacer 16 approaches inner edge 20 of wire 12, spacer's 16 width and thickness (volume) increases at a slightly slower rate than the greater volume of the widening gap 14 between surfaces 18 of wire 12. Thus, a greater net volume of the overall entrance chamber is created, thereby slowing fluid flow and causing less turbulence against entry.

Figure 3:
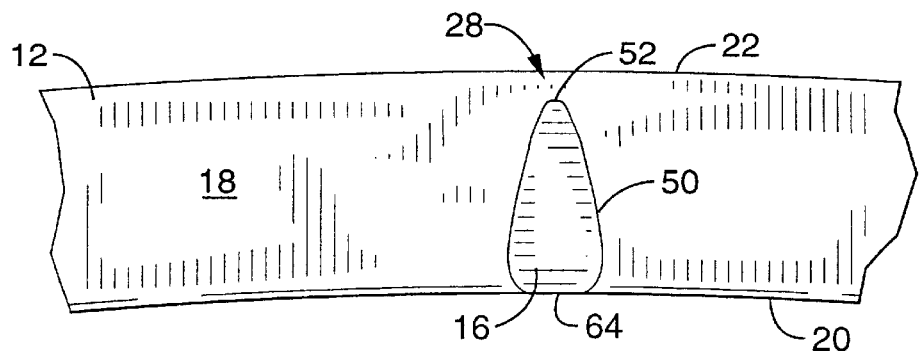
FIG. 3 is top plan view of the preferred embodiment of a ring spacer in accordance with the present invention shown in relation to a fragment of a wire.

Preferably, the outer or acute end 52 of spacer 16 does not extend to outer edge 22 of the wire 12, thus forming a recess 28 from outer surface 26 of well screen 10, as shown in FIG. 3. This creates a greater open area and continuous opening through which fluid can flow through, thus enhancing fluid flow and efficiency. Recess 28 also aids in controlling corrosion as it reduces the fluid flow rate at that location which consequently reduces the occurrence of corrosion.

Figure 4:
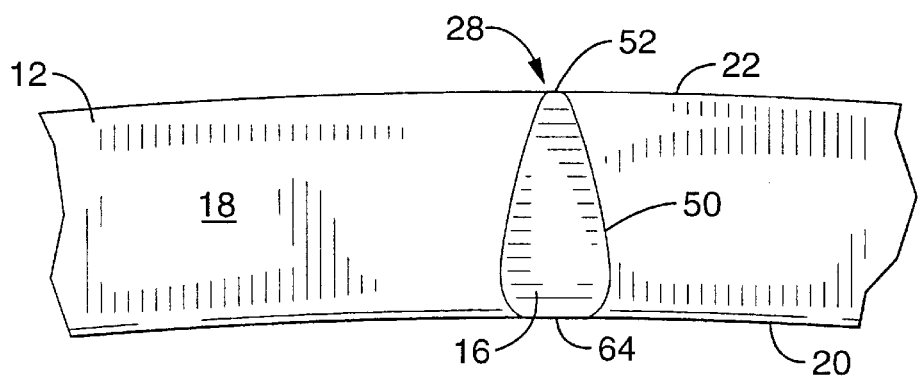
FIG. 4 is top plan view of a second embodiment of a ring spacer in accordance with the present invention shown in relation to a fragment of a wire.

Alternatively, acute end 52 of spacer 16 extends to outer edge 22 of wire 12, as shown in FIG. 4, giving well screen 10 extra strength and rigidity but reducing the amount of open area. However, the open area given up as a result of spacer 16 extending to outer edge 22 of wire 12 can be made up elsewhere, i.e. wider gaps 14 or fewer spacers 16. The number of spacers 16 between each layer of wire 12 varies according to structural, chemical, hydraulic and economic objectives.

Figure 5:
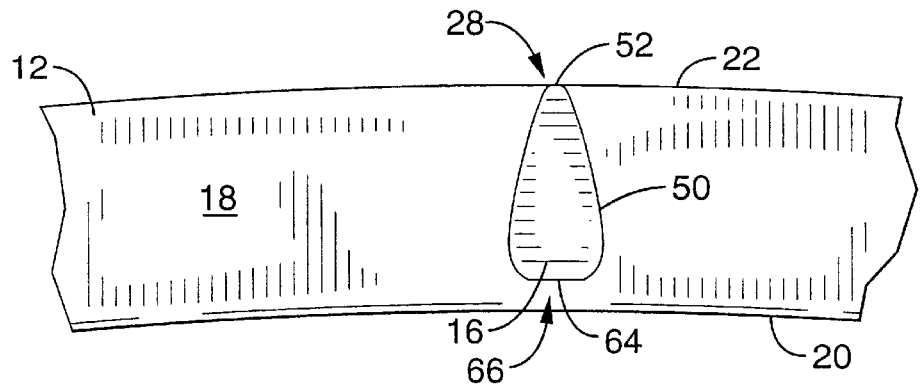
FIG. 5 is top plan view of a third embodiment of a ring spacer in accordance with the present invention shown in relation to a fragment of a wire.
Figure 6:
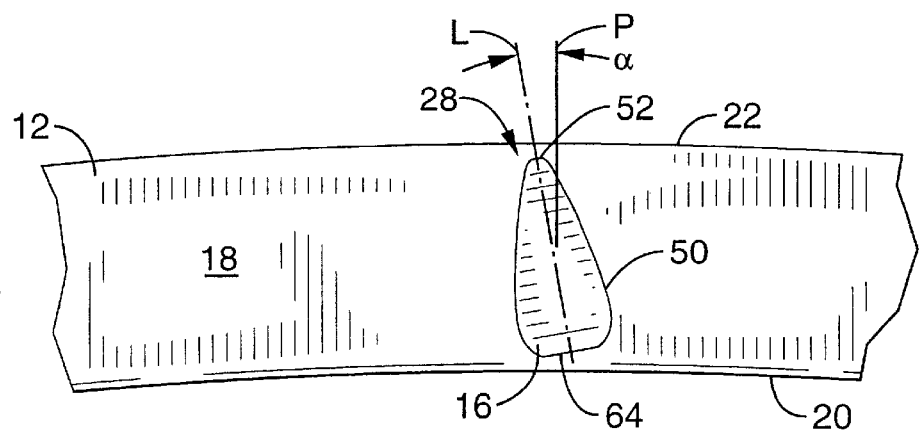
FIG. 6 is top plan view of a fourth embodiment of a ring spacer in accordance with the present invention shown in relation to a fragment of a wire.

Another variation for spacer 16 includes acute end 52 of spacer 16 extending to outer edge 22 of wire 12 and inner end 64 of spacer 16 recessed from inner edge 20 of wire 12 forming inner recess 66, as shown in FIG. 5. Yet another variation is to position spacer 16 such that its longitudinal axis L forms an acute angle α from a perpendicular P to a tangent to outer edge 22 of wire 12, as shown in FIG. 6.

Figure 7:
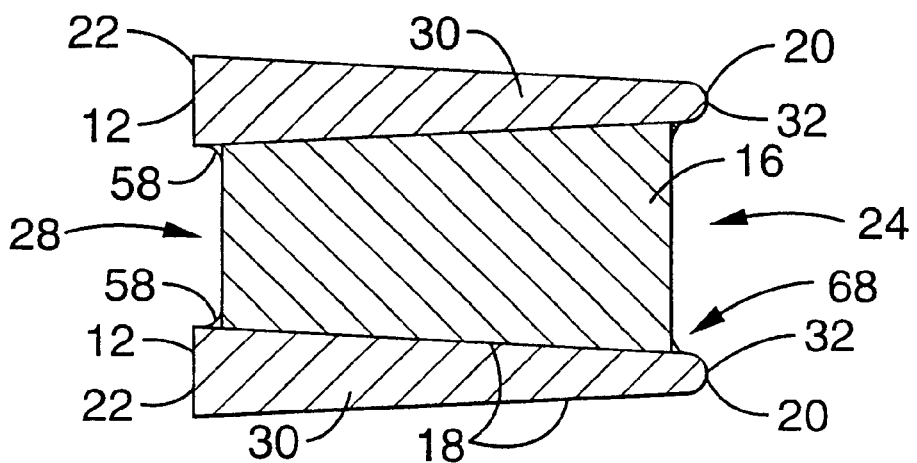
FIG. 7 is a cross-sectional view of the well screen shown in FIG. 2 taken through line 7—7.
Figure 9:
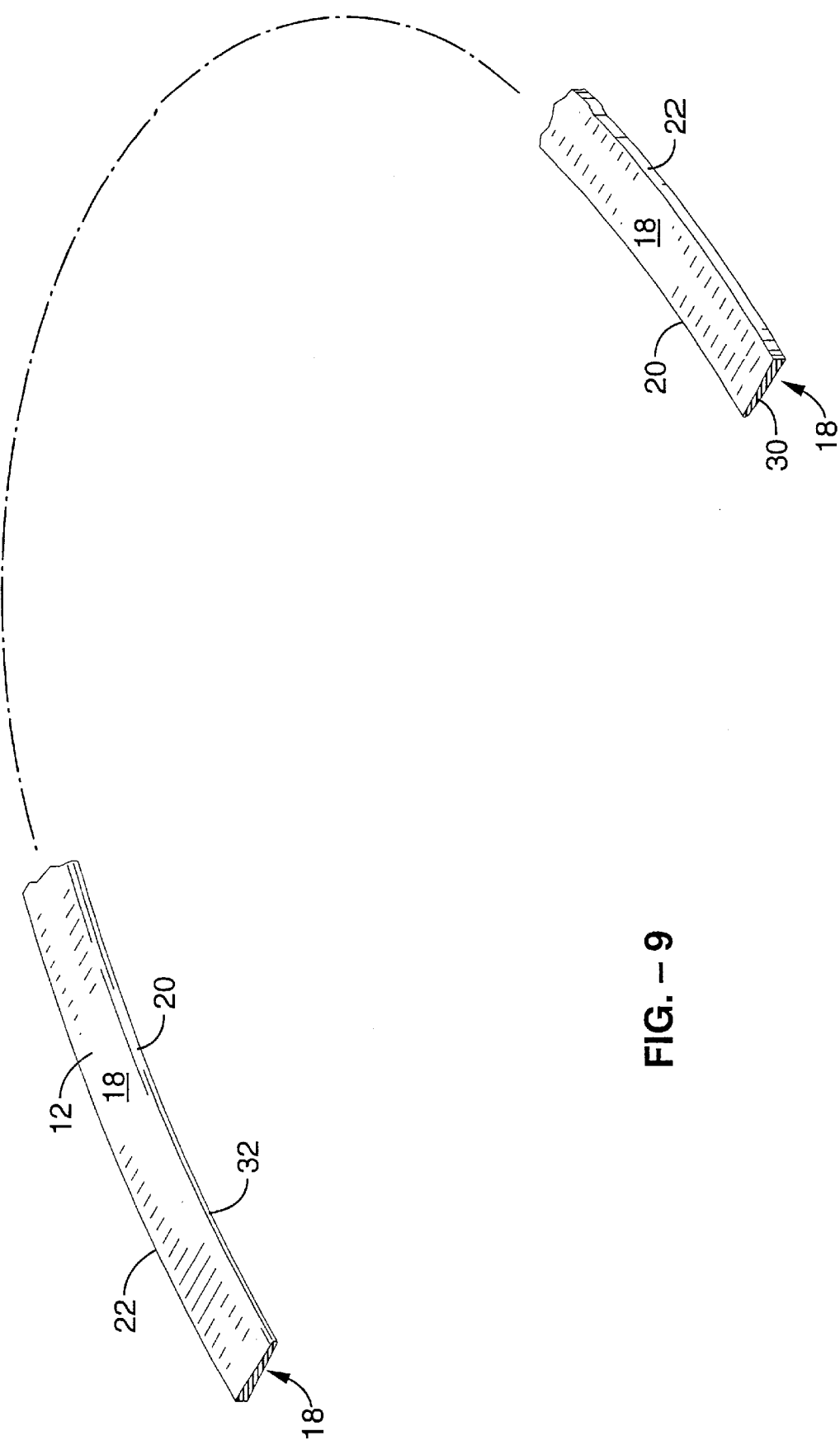
FIG. 9 is a fragmentary cross-sectional view in perspective of the well screen shown in FIG. 2 taken through line 9—9.

Referring also to FIG. 7 and FIG. 9, wire 12 is shown as a cold-rolled formation of a "Vee-shape" or trapezoidal-shape cross section 30 with the apex 32 of the "Vee" or trapezoid oriented towards inner surface 24 of well screen 10. Reducing the width profile (thickness) of the outer edge 22 of wire 12 results in a proportional increase in gap 14, which make up the fluid producing open areas. Because the apex 32 of wire 12 is oriented towards the inner surface 24 of the well screen 10, the volume of gap 14 between the layers of wire 12 increases towards the inner surface 24 of the well screen 10. Ideally, the wire width to gap ratio is in the order of 1:2, with the gap 14 width (thickness) generally being twice the wire 12 width profile (thickness). To relieve triangular stress, wire 12 is preferably wound spirally at an angle up to approximately a 6° inclination as measured from the horizontal plane. It is also contemplated that wire 12 can have other cross-sectional shapes.

The width of gap 14 between the surface 18 of wire 12 is variable depending upon the application of the well screen 10. The width is usually based on the relative size of the formation sand to be excluded. Where sands have a broad size distribution, a gap width of two times as large as the ten percentile diameter of the formation sand has been successfully used. Where sands are generally more uniform in size and rounded, a gap width equal to the ten to fifteen percentile formation sand diameter is used.

Identically fabricated spacers 16 are used during manufacturing which results in precisely formed apertures 54, thus allowing for accurate performance calculations and improved sand and particle filtration. Any length of spacer 16 can be used with any thickness of wire 12 and placed at any point along the wire surface 18 in any direction, thus allowing for optimal hydraulic, structural and chemical considerations. The variable circumferential position and spacer 16 shape can be used to benefit the hydraulic behavior of fluids while inside the confines of well screen 10, in the manner the fluids enter from the formation and in the manner which they are injected into the formation. There is a slight circulation loss that occurs as high volumes of water travel through the inner surface 24 from the outer surface 26 of well screen 10, however this circulation loss can be improved by introducing twists or reliefs to the fluid as it enters well screen 10 to emulate natural whirling drainage patterns. Theoretical radial flow patterns into wells are generally not possible due to geological imperfections so, to equalize entry potential, fluid is forced into more exposure to the more perfect area of artificial gravel pack by slightly twisting the fluid flow in a manner commensurate with turbine pumping activity. Also, injection at different rates can be beneficial for cleaning applications by creating diversion and vortices in the fluid flow. Since the spacer system comprises only two separate pieces, spacer 16 and wire 12, cleaner cuts on the inner surface 24 and outer surface 26 can be created, if necessary, during well fishing operations.

Figure 8:
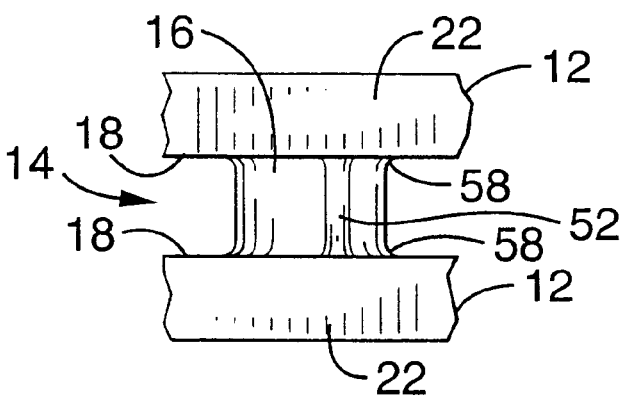
FIG. 8 is a fragmentary side elevation view of the well screen shown in FIG. 2 showing a spacer between two wires and fillet welds between the spacer and wires.

The spacer system allows for precise connections between surface 18 of wire 12 by drawing them over a round mandrel or by placing them in a socket and fusion welding them in place. The result is a significantly reduced tubular ellipticity, an important consideration in conventional screen design as most failures occur due to collapse from elliptical induced weaknesses. Fillet welds 58, as shown in FIG. 7 and FIG. 8, around the joints of spacer 16 to wire 12 can further strengthen well screen 10 by reducing triangular stresses. For even greater structural rigidity, spacers 16 can be positioned on the wire surface 18 mid-way above and below an aperture 54, which is formed by the surface boundaries of wire 12 and spacer 16 combination. This basically forms a diamond pattern which reduces leveraged stress across the wire. However, to allow for some flexibility of well screen 10, spacers 16 are positioned at intervals such that a portion of gaps 14 lie directly above and directly below each spacer 16. Therefore, the exact positioning of spacer 16 is driven by the direction and angle well screen 10 must be contorted.

Figure 11:
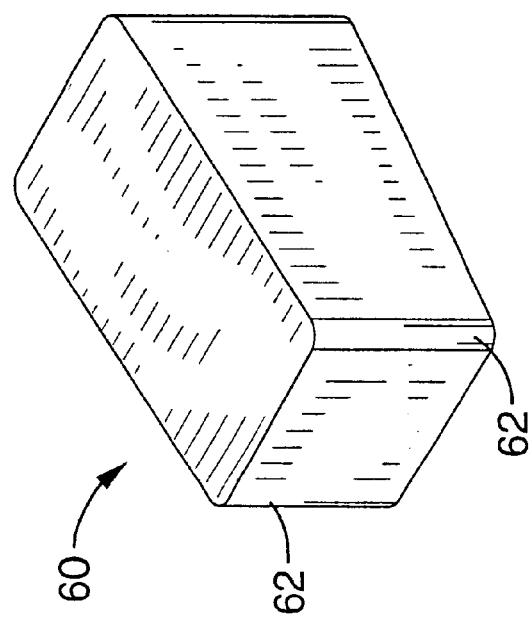
FIG. 11 is a perspective view of a parallelogram-shaped spacer in accordance with the present invention.
Figure 10:
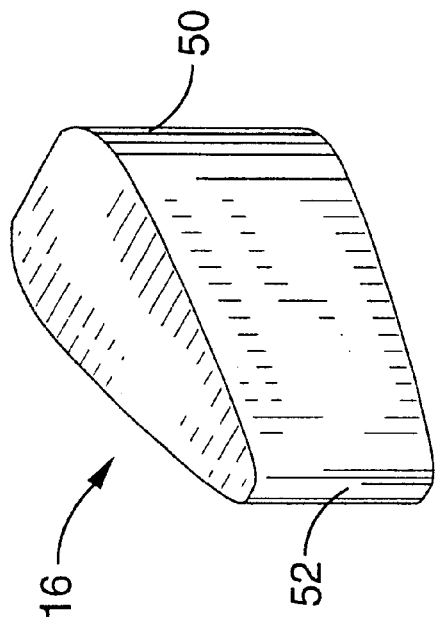
FIG. 10 is a perspective view of an elliptical spacer in accordance with the present invention.

The flush inner surface 24 of the well screen 10 allows greater penetration of line scratching (vertical wire brushing) and rotary scratching (rotary brushing). There is a geometric advantage formed during rotary brushing in that at the point of contact with inner rods, bristles are deflected away from the last portion of the sweep through the aperture area. An alternative spacer design in the form of a parallelogram 60 with curved corners 62, as shown in FIG. 11, allows both the initial sweep to be completed and subsequent entry and guiding of the same or new bristles into the next successive aperture, thus achieving a more thorough cleaning. It is also contemplated that spacers 16 could be of other shapes, including but not limited to, straight-edged, curved and curvilinear shapes. Spacer 16 could also be asymmetrically shaped such that a vortex is generated by the fluid entering well screen 10 to emulate natural whirling drainage patterns.

The invention can be manufactured using a conventional secondary cold rolling process, resulting in greater precision of all aspects of the well screen 10. This process can be followed by a "bead blasting" polishing process, to reduce microscopic irregularities on the wire surface 18 that can contribute to the formation of hydraulic eddies, which are detrimental to smooth and efficient fluid flow. Both processes serve to increase the strength of the well screen 10.

The ability to manipulate spacer 16 placement, shape, position, and quantity allows well screen 10 to flex to fit non-linear wells. There also exists the possibility to couple any length of the well screen assembly with swiveling couplings, thus allowing a high degree of directional change without the need for a manufacturing design change.

FIG. 12 illustrates an alternate embodiment of the invention wherein "C" represents the central axis of the ring well screen 34. Ring well screen 34 comprises a plurality of rings 36 vertically stacked and attached together by spacers 16 placed at intervals circumferentially on the surface 38 of rings 36. Rings 36 are formed by using a cold-rolled formation of a "Vee-shape" or trapezoidal-shape wire 30, as previously shown in FIG. 7, which has undergone an electroresistance and pressure welding process to form a ring 36. Ring 36 has a generally trapezoidal cross section 30 with the apex 32 oriented towards the inner surface of well screen 34. All the other aspects of this ring well screen share a similarity to the wire well screen previously discussed.

Figure 13:
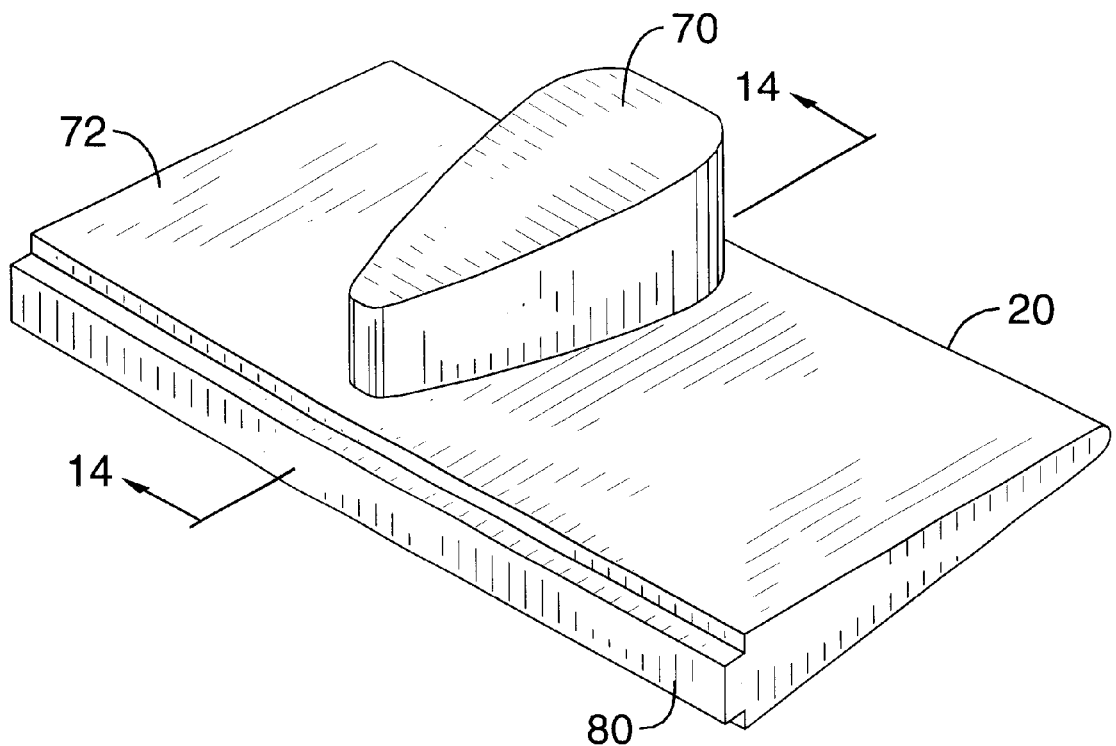
FIG. 13 is a fragmentary perspective view of alternative embodiment of a wire or ring according to the present invention where the spacer is integrated into the top surface of the wire or ring.

FIG. 13 depicts a section of wire or ring in an alternative embodiment of the invention where spacers 70 are integrated into the top surface of the wire or ring at regular intervals. Spacers 70 may be integrated on either the top 72 or bottom 74 surfaces of the wire or ring. It will be appreciated that the total number of welds necessary to fabricate the screen will be reduced by half with this embodiment. It will also be appreciated that the spacers alternatively could be integrated into the bottom surface of the wire or ring, or integrated into both the top and bottom surface in an alternating pattern.

Figure 14:
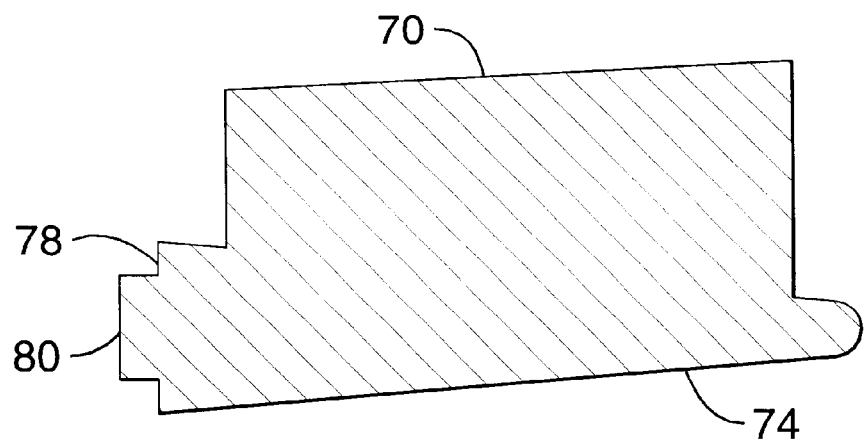
FIG. 14 is a cross-sectional view of the wire or ring embodiment shown in FIG. 13 taken through lines 14—14.

FIG. 14 is a cross sectional view of the integrated spacer configuration shown in FIG. 13. Note also that FIG. 13 and FIG. 14 illustrate a configuration wherein the outside diameter 76 of the wire or ring 78 ultimately forming the exterior surface of the screen has a square shaped ridge 80. The trapezoidal or "Vee-shaped" cross section of the wire or ring with the apex 82 oriented toward the inner surface of the screen is maintained in this embodiment.

Figure 15:
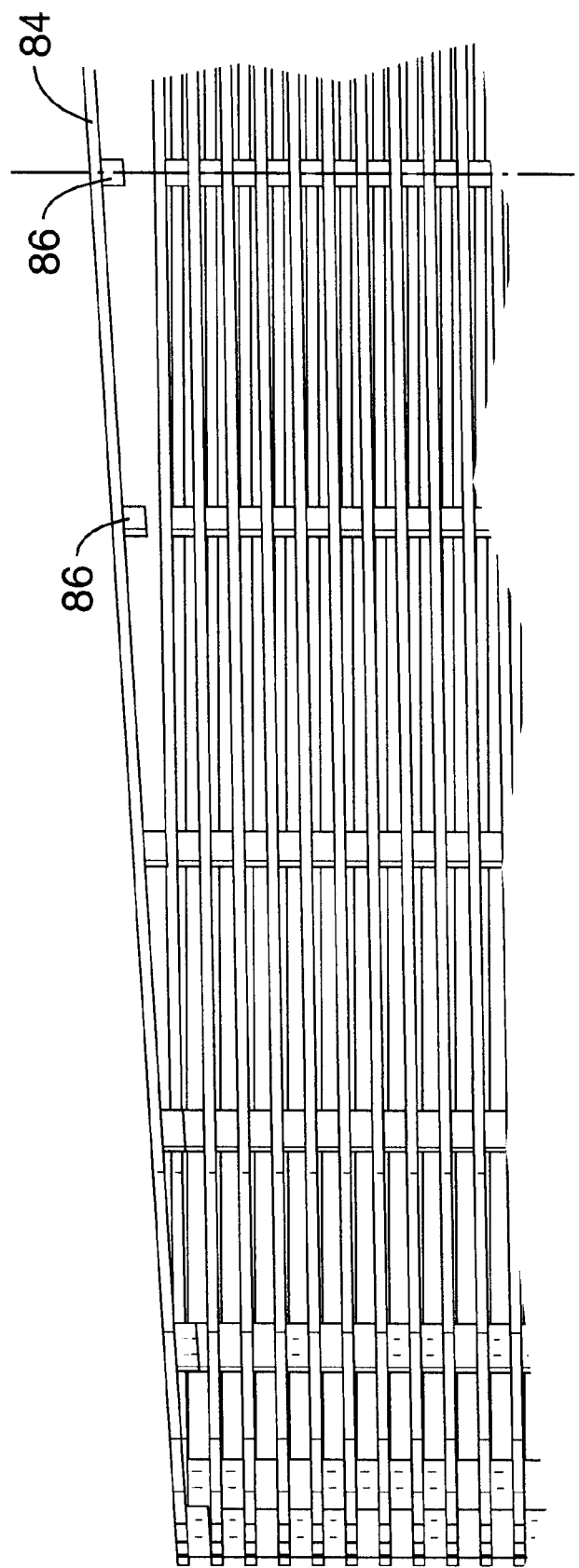
FIG. 15 is a side view of a section of an alternative embodiment of the invention showing a wrapped wire configuration with integrated spacers on the bottom surface of the wire.

FIG. 15 shows yet another alternative embodiment of the invention where the well screen is formed by wire 84 having spacers 86 integrated into the wire at regular intervals along its length. Wire 84 is spirally wound, preferably onto a cylindrical mandrel, and the spacers are positioned along the wire so as to achieve a vertical alignment when the wire is wound. Spacers 86 are welded to the top surface of the adjoining wire as described previously. Preferably the cold working of the material should not exceed 30%. Spacers 86 may be present on the top, bottom or top and bottom surfaces of wire 84.

Figure 16:
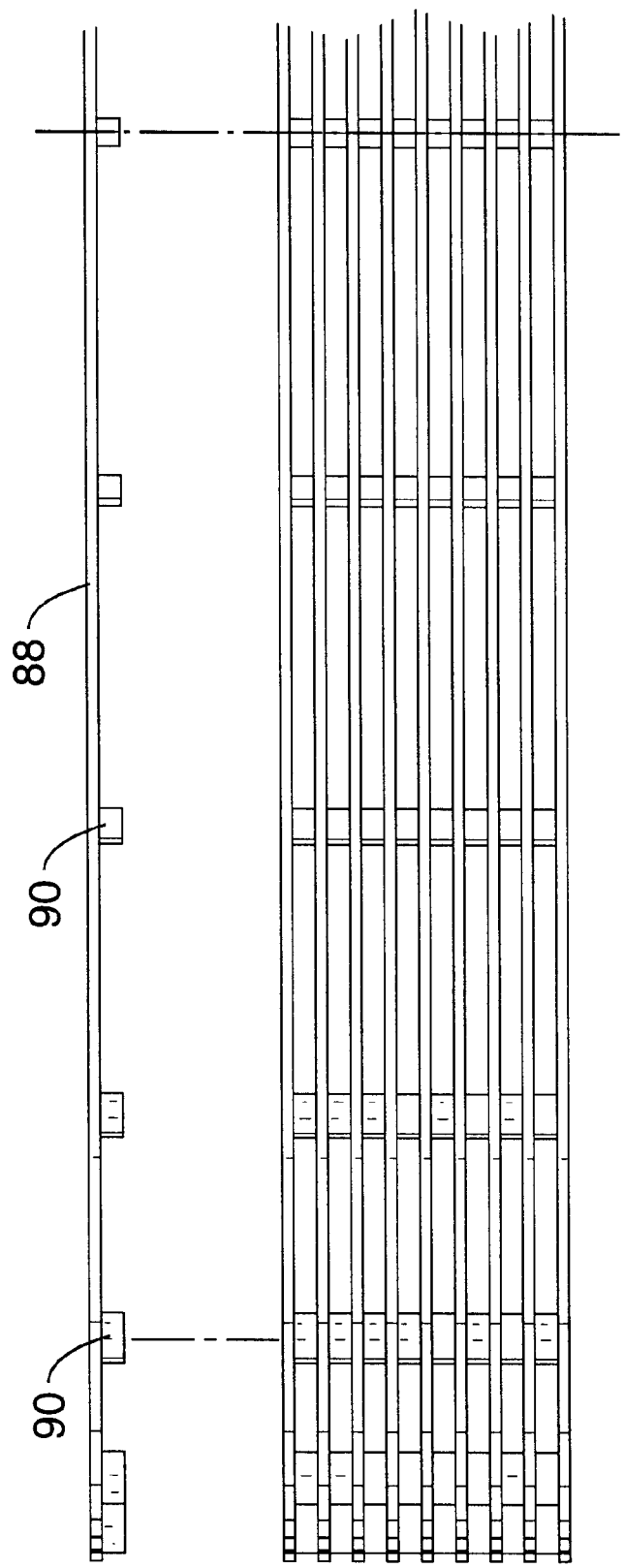
FIG. 16 is a side view of a second of an alternative embodiment of the invention showing a ring configuration having integrated spacers along the bottom surface of the rings.

FIG. 16 shows another embodiment utilizing concentric rings 88 of identical diameter to form the screen. Integrated spacers 90 are present on the surface of the rings which are welded or secured to an adjoining ring. In these embodiments, fewer welds are required to manufacture the well screen.

Figure 17:
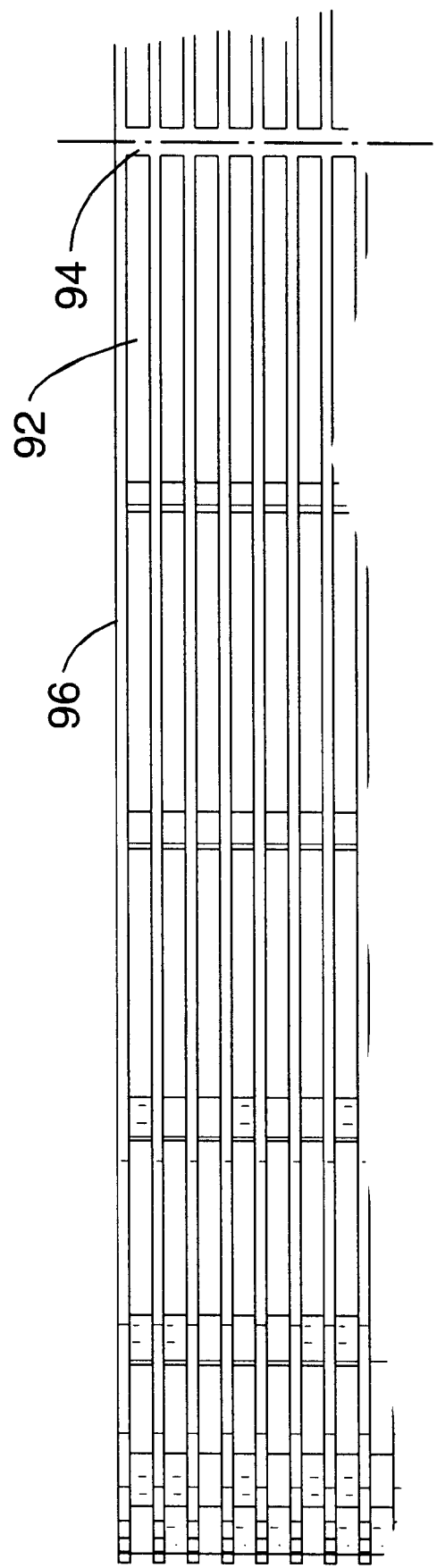
FIG. 17 is a side view of a section of an alternative embodiment of the invention where material is removed from a solid tube to form the screen.

Finally, FIG. 17 shows a further alternative embodiment where the screen is manufactured from preformed tubes. The tubes are machined to remove material to form horizontal gaps 92 leaving spacing support portions 94 and horizontal members 96 having a trapezoidal shaped cross section of such dimensions as the rings 36 and spacers 16 described herein.

Those skilled in the art will appreciate that the invention herein can be fabricated from stainless steel, low carbon steel, plastic, polymers, carbon fiber, ceramics and other materials suitable for use in well environments. It will also be appreciated that the invention can be used as a drive point, strainer, filter, or other fluid porous media Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A well screen, comprising:
   (a) a plurality of concentric spaced-apart rings forming a porous cylinder said rings having upper and lower surfaces, said cylinder including an outer surface and an inner surface; and
   (b) a plurality of spacers positioned in gaps between said rings, said spacers including an inner and outer edge, said inner edge and said outer edge defining a longitudinal axis therebetween;
   (c) wherein said spacers are securely attached to said rings, and wherein at least one said spacer is integrally formed with a surface of a said one of said rings.

2. A well screen as recited in claim 1, wherein at least one said spacer is integrally formed with surfaces of adjacent rings.

3. A well screen as recited in claim 1, wherein said integrally formed spacer is welded to an adjacent ring.

4. A well screen as recited in claim 1, wherein said inner edges of said spacers are flush with said inner surface of said cylinder, and wherein said outer edges of said spacers are flush with said outer surface of said cylinder.

5. A well screen as recited in claim 1, wherein said inner edges of said spacers are recessed from said inner surface of said cylinder, and wherein said outer edges of said spacers are flush with said outer surface of said cylinder.

6. A well screen as recited in claim 1, wherein said inner edges of said spacers are recessed from said inner surface of said cylinder, and wherein said outer edges of said spacers are recessed from said outer surface of said cylinder.

7. A well screen as recited in claim 1, wherein said longitudinal axis of each said spacer is generally perpendicular to a tangent of said rings between which said spacer is positioned.

8. A well screen as recited in claim 1, wherein each said spacer is positioned such that said longitudinal axis forms an acute angle from a perpendicular to a tangent to said rings between which said spacer is positioned.

9. A well screen as recited in claim 1, wherein each said spacer has a width and a thickness, wherein said width of each said spacer increases as said spacer extends toward said inner surface of said cylinder, and wherein said thickness of each said spacer increases as said spacer extends toward said inner surface of said cylinder.

10. A well screen as recited in claim 1, wherein each said spacer has an elliptical shape with an acute end and an obtuse end, and wherein said acute end of each said spacer is oriented towards said outer surface of said cylinder.

11. A well screen as recited in claim 1, wherein each said spacer is parallelogram-shaped with four curved corners.

12. A well screen as recited in claim 1, wherein said rings have a trapezoidal cross-section having an apex oriented towards said inner surface of said cylinder.

13. A well screen as recited in claim 1, wherein each said spacer is shaped such that fluid passing through said gaps create a vortex.

14. A well screen as recited in claim 1, wherein said rings have an outer edge with a ridge.

15. A well screen as recited in claim 1, wherein each said spacer is shaped such that fluid passing through said gaps create a vortex.

16. A well screen as recited in claim 1, wherein windings have an outer edge with a ridge.

17. A well screen, comprising:
   (a) a wire wound spirally to form a porous cylinder having a plurality of spaced-apart windings, said cylinder including an outer surface and an inner surface; and
   (b) a plurality of spacers positioned in gaps between said windings, said spacers including an inner and outer edge, said inner edge and said outer edge defining a longitudinal axis therebetween;

(c) wherein said spacers are securely attached to said windings, and wherein at least one said spacer is integrally formed with a surface of a said wire.

18. A well screen as recited in claim 17, wherein said integrally formed spacer is welded to an adjacent winding.

19. A well screen as recited in claim 17, wherein said inner edges of said spacers are flush with said inner surface of said cylinder, and wherein said outer edges of said spacers are flush with said outer surface of said cylinder.

20. A well screen as recited in claim 17, wherein said inner edges of said spacers are recessed from said inner surface of said cylinder, and wherein said outer edges of said spacers are flush with said outer surface of said cylinder.

21. A well screen as recited in claim 17, wherein said inner edges of said spacers are recessed from said inner surface of said cylinder, and wherein said outer edges of said spacers are recessed from said outer surface of said cylinder.

22. A well screen as recited in claim 17, wherein said longitudinal axis of each said spacer is generally perpendicular to a tangent of said windings between which said spacer is positioned.

23. A well screen as recited in claim 17, wherein each said spacer is positioned such that said longitudinal axis forms an acute angle from a perpendicular to a tangent to said windings between which said spacer is positioned.

24. A well screen as recited in claim 17, wherein each said spacer has a width and a thickness, wherein said width of each said spacer increases as said spacer extends toward said inner surface of said cylinder, and wherein said thickness of each said spacer increases as said spacer extends toward said inner surface of said cylinder.

25. A well screen as recited in claim 17, wherein each said spacer has an elliptical shape with an acute end and an obtuse end, and wherein said acute end of each said spacer is oriented towards said outer surface of said cylinder.

26. A well screen as recited in claim 17, wherein each said spacer is parallelogram-shaped with four curved corners.

27. A well screen as recited in claim 17, wherein said windings have a trapezoidal cross-section having an apex oriented towards said inner surface of said cylinder.

\* \* \* \* \*